United States Patent Office 3,792,087
Patented Feb. 12, 1974

3,792,087
VAPOR PHASE OXIDATION OF ETHYLENE TO ACETIC ACID
Dorothee M. McClain, Cincinnati, Ohio, Carol A. Heller, Dillsboro, Ind., and Irving L. Mador, Cincinnati, Ohio, assignors to National Distillers and Chemical Corporation, New York, N.Y.
No Drawing. Continuation-in-part of abandoned application Ser. No. 99,282, Dec. 17, 1970. This application Nov. 10, 1971, Ser. No. 197,528
Int. Cl. C07c 51/32, 53/08
U.S. Cl. 260—533 R     5 Claims

ABSTRACT OF THE DISCLOSURE

A process for the selective production of acetic acid from ethylene with co-production in minor amounts of acetaldehyde, ethanol and carbon oxides, by reaction of ethylene and oxygen with added water in the feed, in the vapor phase in the presence of a catalyst composition containing phosphoric acid and a catalytically effective amount of palladium metal.

RELATED APPLICATION

This application is a continuation-in-part of U.S. application Ser. No. 99,282, filed Dec. 17, 1970, and now abandoned.

BACKGROUND OF THE INVENTION

The vapor phase oxidation of ethylene to acetaldehyde is well known. For example, in the Wacker process, as illustrated by U.S. Pat. No. 3,131,223, ethylene together with an oxygen-containing gas and water vapor are passed over a noble metal compound catalyst to produce the aldehyde. The noble metal ions are characterized as the active component of such catalyst, the metals per se being described as having "no noteworthy activity." The use of redox components to maintain the noble metal catalyst constituent in the oxidized state (U.S. 3,131,223; 3,057,-915; or 3,301,905), or acids, e.g., sulfuric acid, nitric acid, hydrochloric acid, phosphoric acid or acetic acid, to increase anion concentrations (U.S. 3,131,223 or 3,057,-915), has been described as increasing catalyst activity in such operations. The use of a noble metal catalyst is disclosed in U.S. Pat. 3,439,044. In all the processes described in the cited patents, however, the principal reaction product formed is acetaldehyde, at most only small amounts of acetic acid being produced as a by-product in the reaction.

In two of the above patents specific values are given for both acetic acid (HOAc) and acetaldehyde (HAc) formation:

| U.S. 3,057,915 | | U.S. 3,439,044 | |
|---|---|---|---|
| Example number | Approximate molar ratio of HOAc/HAc formed | Example number | Approximate molar ratio of HOAc/HAc formed |
| 1 | 0.33–0.40 | 1 | 0.10 |
| 2 | 0.33–0.43 | 2 | 0.05 |
| 3 | 0.25–0.26 | 4b | 0.07 |
| 4 | 0.33 | 5 | 0.09 |
| | | 7 | 0.10 |

None of these examples demonstrate formation of acetic acid in amounts even equivalent to the amounts of acetaldehyde formed.

U.S. Pat. No. 3,534,093 discloses a process for the selective formation of acetic acid by the oxidation of ethylene in the presence of a palladium metal or palladium-gold alloy catalyst. The reactions described in the examples of this patent were, however, apparently carried out at sub-atmospheric pressures in the presence of unsupported catalyst materials and excess quantities of oxygen, and in the absence of added water vapor, the reaction products being separated and recovered by freezing. Such operations necessitate the use of special equipment and cannot be readily and economically carried out on a commercial scale. Moreover, as illustrated hereinafter, the use of a palladium metal catalyst in commercially adaptable heterogeneous catalyst systems employed at atmospheric or superatmospheric pressures, and with feed mixtures within the flammability range, is unsatisfactory, acetic acid not being formed in appreciable conversions or selectivities therein.

The present commercial techniques for the manufacture of acetic acid from ethylene involve hydrating the olefin to ethanol followed by dehydrogenating or oxidatively dehydrogenating the ethanol to acetaldehyde and then oxidizing the acetaldehyde to acetic acid, or initially oxidizing the ethylene to acetaldehyde followed by a second oxidation under different conditions to obtain the acetic acid. Attempts have been made to combine these multiple operations into a single step synthesis of acetic acid from ethylene without substantial practical success.

A one-step vapor phase process for the oxidation of ethylene, in the presence of a catalyst containing palladium chloride and a vanadium or molybdenum oxide, is described in U.S. Pat. No. 3,240,805. The use of a combination catalyst comprising a noble metal compound, a compound of a transition metal element of Groups I, VII and VIII, an alkali metal compound and a compound of a transition metal element of Groups III–VI for such purpose is taught in U.S. Pat. No. 3,293,291. A further variation, i.e., the use of a catalyst mixture of a salt or co-ordination compound of palladium and a carboxylate of iron, cobalt or manganese, is disclosed in U.S. Pat. No. 3,459,796. British Pat. No. 1,142,897 suggests employing yet another catalyst system, viz., a supported mixture of palladium metal and a transition metal oxide or salt, for the ethylene based production of acetic acid. In general, however, commercial adoption of these procedures has not been possible because of the relatively large amounts of by-product acetaldehyde simultaneously produced therein and/or the concomitant large losses of ethylene reactant attributable to combustion to carbon dioxide.

It is, therefore, a principal object of the present invention to provide a process for the selective preparation of acetic acid by the direct vapor phase oxidation of ethylene with attendant low co-production of combustibles and acetaldehyde. The method of the present invention, unlike those previously suggested, provides high selectivity, good rates of conversion and long catalyst life. Further objects and advantages of the invention will become apparent to those skilled in the art from the following detailed description of preferred forms thereof.

SUMMARY OF THE INVENTION

It has been found that acetic acid is selectively produced when ethylene is oxidized in the vapor phase with added water in the feed and in the presence of a catalyst composition containing phosphoric acid and a catalytically effective amount of palladium metal. The process is carried out at elevated temperatures, employing a heterogeneous catalyst contact system, e.g., systems utilizing fixed, moving or fluidized catalyst beds. The essential elements of the process comprise the use of a catalyst composition containing palladium metal and phosphoric acid, and the presence of added water vapor in the gaseous feed stream. When these features are employed in lieu of the catalyst compositions or reaction systems which have been previously proposed, the selective production of acetic acid with concomitant decreased formation of acetaldehyde and minimized combustion of the ethylene feed is effected.

PREFERRED EMBODIMENTS OF THE INVENTION

In accordance herewith, a gaseous feed comprising ethylene, oxygen and water vapor is contacted with a catalyst to selectively form acetic acid, by the following overall reaction (the specific mechanism of which is, not however, completely understood):

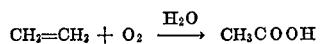

$$CH_2=CH_2 + O_2 \xrightarrow{H_2O} CH_3COOH$$

The ethylene employed may be fed in pure form or, alternatively, may be impure in the sense that it may contain as an inert diluent minor amounts, e.g., up to about 50 mole percent thereof, of a saturated hydrocarbon vapor such as methane, ethane or propane gas. The oxygen in the feed may similarly be pure oxygen gas or, alternatively, an oxygen-containing gas mixture such as air or air enriched with oxygen. In addition to these materials the gaseous feed mixture reacted in the process may contain other inert diluents such as carbon dioxide, nitrogen or acetic acid, as well as other reactive diluents such as acetaldehyde. Acetic acid may thus replace a portion of the water feed, thereby reducing process heat loads in recycle operations. When acetaldehyde is incorporated in the feed mixture it is substantially converted to acetic acid as it passes through the reaction zone.

While stoichiometric proportions of the ethylene and oxygen reactants, viz., equimolar proportions thereof, may be utilized in the vapor phase process of this invention, such compositions are normally within the flammability range. It is preferred to operate with an oxygen-lean feed, i.e., where the oxygen is the limiting reactant present. Such a feed may contain about 5 to 20 mole percent oxygen. The addition of acetic acid to the feed as an inert diluent is particularly effective in extending the flammability limit for oxygen-lean feeds.

The equation for the formation of acetic acid does not require water as a reactant. In practice, however, it has been found in accordance herewith that high conversions and selectivities to acetic acid are obtained when the feed does include water. The water may range from about 0.2 to 6, preferably about 2 to 4, moles per mole of oxygen. The upper limit on the amount of water employed is related to the temperature and pressure conditions: if the temperature be too low or the pressure too high an excessive amount of water in the feed will leach the phosphoric acid from the carrier and cause it to run off.

The water may be added to the feed stream by passing the normally gaseous reactants (ethylene, oxygen) through liquid water, optionally held at an elevated temperature. Alternatively, water as a liquid may be metered by a pump and volatilized in a pre-heater. The mode of addition or mixing of the reactants with water is not an integral part of the present invention.

In the course of long term operation of the catalyst composition some phosphoric acid may be lost by volatilization. It is suitable to replenish this amount by including some phosphoric acid in the feed stream in vapor form, or adding it as a liquid to the top of the catalyst bed.

As indicated hereinabove, the gaseous reaction mixture is contacted with a supported catalyst composition incorporating phosphoric acid and a catalytically effective amount of palladium metal. Carriers conventionally employed in the catalyst art including, for example, silica, alumina, titania, zirconia, carbon such as activated carbon or the like, celite, silica-alumina or boron phosphate catalyst supports may be employed in such supported catalyst materials. The supports are impregnated or loaded with the phosphoric acid and the palladium metal, whether alone or admixed, alloyed, or in solid solution with a further metal (e.g., a material selected from Group I-B or Group VIII of the Periodic Chart of the Elements), is deposited on the support. The catalytically effective palladium metal and the phosphoric acid may be deposited on or impregnated in the catalyst carrier in any desired manner or sequence, the combined supported catalyst composition, however formed, being active in the vapor phase process of this invention.

Silica or carbon are preferably utilized as catalyst carriers in the process hereof. It has been found that catalysts deposited on such supports exhibit superior stability characteristics.

The palladium metal is incorporated in amounts of from about 0.01 to 5%, preferably from about 0.1 to 2%, by weight of the supported catalyst composition, on the other hand, the phosphoric acid is incorporated in the catalyst composition in amounts of at least about 2% and up to as much as about 85% by weight of the phosphoric acid plus catalyst carrier. The amount of phosphoric acid employed in any given catalyst composition is dependent upon the particular carrier, phosphoric acid loadings of from about 5 to 10% having been found particularly suitable with some carriers (e.g. alumina). When, on the other hand, silica catalyst carriers are utilized, varying results have been obtained with silicas of differing origin, some silicas exhibiting best results at loadings of as high as 85% phosphoric acid and others exhibiting optimum characteristics at 15–25% loadings.

The phosphoric acid content will also depend on the thermal history of the particular carrier chosen. Carriers such as alumina and silica tend to react with phosphoric acid. The extent of reaction depends on the carrier and the temperature. With some carriers the reaction is reversible under the acetic acid synthesis conditions. all designations of phosphoric acid content herein are based on the total contained phosphoric acid, both free and bound.

Deposition of the catalytically effective amount of palladium metal utilized in this process may also be effected by conventional techniques, such as by contacting the catalyst support with a solution of a suitable palladium salt or complex, e.g., palladium acetate, palladium nitrate, palladium chloride or palladium acetylacetonate, and thereafter reducing the palladium compound to the metal with hydrogen or other appropriate reducing agent. Alternatively, the salt may, if desired, be reacted with alkali to form the corresponding palladium oxide or hydroxide and thereafter reduced to the catalytically active metal. The alkali or corresponding alkali salt is removed after reduction by washing with water.

When the palladium metal is deposited prior to impregnation of the support with phosphoric acid the palladium salt may be applied from either aqueous or organic media, e.g., water or organic solvents such as the lower alkanols, e.g., methanol or ethanol; benzene; chloroform, or the like. Whenever a palladium halide is utilized for the formation of the palladium metal catalyst the metal deposit is thereafter washed with water to remove all of the halide ions prior to use of the catalyst.

When the catalytically active palladium metal is deposited on the catalyst support after impregnation of the phosphoric acid, the palladium salt is usually applied from an organic solvent. Organic media are preferred for deposition of palladium metal in this alternative embodiment inasmuch as the presence of water may tend to remove a portion of the phosphoric acid catalyst component from the carrier. The active palladium metal-phosphoric acid catalyst composition so formed is reduced from a palladium salt other than a halide, since the catalyst support may not thereafter be water-washed to remove the halide ions without simultaneous loss of a portion of the phosphoric acid catalyst component.

The catalyst carrier may be loaded with the phosphoric acid component by impregnating the support with a dilute or concentrated phosphoric acid, e.g., 85% phosphoric acid, and subsequent drying of the carrier as, for example, in a vacuum oven. The impregnated support may thereafter be calcined to improve bonding of the phosphoric acid impregnant to the carrier.

It will be understood that the present invention resides in the use of the above described catalyst composition containing phosphoric acid and a catalytically effective amount of palladium metal in the selective vapor phase oxidation of ethylene to acetic acid, and not in the particular mode of formation of the indicated catalyst composition. Thus, as indicated above, the active material may be formed by deposition of palladium metal either before or after impregnation of the carrier with the phosphoric acid component, and/or commercially available catalyst materials may be utiized in the preparation of the combined catalyst composition. Hence, either commercilly available supported palladium metal catalysts may be treated with phosphoric acid, or commercially available supported phosphoric acid catalysts may have palladium metal deposited thereon, to form the catalyst materials useful in the present process.

The vapor phase reaction is carried out by passing the gaseous reaction mixture of ethylene, oxygen and water, with or without the further diluents described, into contact with the supported palladium metal-phosphoric acid catalyst composition. As previously noted, the gaseous mixture may be contacted with the catalyst in any suitable manner, whether by maintaining the latter in a fixed or moving bed or by utilizing fluidized bed operations.

The vapor phase reaction is suitably carried out at temperatures within the range of from about 100° to 250° C., preferably up to about 225° C. Temperatures greater than about the latter value may result in undue ethylene combustion and increased side reactions, e.g., ethylene polymerization. Employing alumina-supported catalysts, for example, reaction temperatures of from about 105° to 135° C. are suitable, whereas when the reaction is conducted in the presence of catalysts incorporating silica carriers, it is suitably performed at temperatures within the range of from about 120° to 225° C.

The process may be conducted either at atmospheric or elevated pressures, the use of higher pressures somewhat increasing product conversions. The disclosed operations may thus be effected at pressures of up to about 300 p.s.i.g. It is, however, generally preferred to carry out the process under pressures only slightly in excess of atmospheric, e.g., up to about 75 p.s.i.g., to increase productivity and catalyst efficiency.

After the gaseous reaction mixture contacts the catalyst bed the exhaust gases are cooled and scrubbed to facilitate recovery of the acetic acid product. The product may be separated by any convenient means, e.g., by distillation. Unreacted feed material separated from the reactor effluent may thereafter be recovered and recycled for further reaction.

The following examples are directed to preferred embodiments of the vapor phase process hereof. In the examples, which are intended as illustrative and which should not be construed in a limiting sense, all parts and percentages are given by weight and temperatures in degrees Centigrade unless otherwise specified. Further, as employed herein, the "Conversion" to acetic acid and the "Selectivity" of acetic acid formation is defined as follows:

$$\text{Percent conversion} = \frac{\text{Moles of acetic acid formed}}{\text{Moles of acetic acid theoretically produced}} \times 100$$
based on limiting reactant $$\text{Percent selectivity} = \frac{\text{Moles of acetic acid formed}}{\text{Moles of ethylene reacted}} \times 100$$

The palladium metal catalyst contents specified above, or identified in the ensuing examples, are given as percentages of the total weight of the supported catalyst compositions, including both the support and the phosphoric acid and palladium metal components. On the other hand, the phosphoric acid contents specified above, or identified in the ensuing examples, are given as percentages of the weight of the catalyst support, including the carrier and the phosphoric acid loaded or impregnated therein. The respective catalyst component concentrations are approximate, i.e., they represent nominal or design concentrations rather than precise concentrations determined by analysis.

The procedures employed for preparation of the catalyst compositions and for carrying out the vapor phase ethylene oxidation reactions of the experiments involved in the following examples are described below. It will be understood that, as indicated hereinabove, the following procedures for preparation of the catalyst compositions are not critical, and may be modified within the purview of this invention.

(A) Preparation of the catalyst composition (1) Silica-supported materials: A silica-supported catalyst composition was prepared employing a commercially available silica catalyst having approximately 85% phosphoric acid previously deposited thereon. The palladium was deposited on the silica support by impregnating the carrier sample with a solution of the acetylacetonate in chloroform (about 8 to 10 ml. of chloroform being employed for each gram of the acetylacetonate compound). The thus treated material was then dried.

The acetylacetonate compound was reduced by heating the catalyst composition in a stream of hydrogen (2 liters/hr.). The catalyst was first purged with nitrogen and heated at 50° C. After approximately 10 minutes of nitrogen purging hydrogen was added to the nitrogen stream, the hydrogen flow being slowly increased and the nitrogen flow being slowly decreased until only hydrogen was fed over the catalyst material. The sample was further heated and reduction took place starting at about 80° C. The catalyst composition was heated to 200° C. and maintained at that temperature for one hour. After cooling it was maintained under a nitrogen blanket prior to use.

(2) Alumina-supported materials: An alumina-supported catalyst composition was prepared by depositing the noble metal on commercially available alumina tablets (having a surface area of 18 meters$^2$/gram and a ⅛ inch diameter), employing the procedure described above with reference to the silica-supported catalyst material.

The alumina support having the noble metal catalyst component thereon was loaded with phosphoric acid by placing the appropriate amount of aqueous phosphoric acid for the preparation of the sample in a round-bottom flask, adding the support, and evaporating excess water in a rotary evaporator heated in a boiling water bath. The impregnated catalyst composition was further dried in a vacuum oven at 90° C. for two hours, and thereafter maintained in a desiccator prior to use.

(3) Carbon-supported materials: A carbon-supported catalyst was prepared by contacting 100.0 g. of 8 to 30 mesh carbon granules with a solution prepared by dissolving 2.25 g. palladous chloride, 1.23 g. auric chloride trihydrate and 1.5 g. sodium chloride in 115.0 cc. deionized water to which 5 cc. of 37% formaldehyde was added immediately prior to the carbon coating. With rotation of the mass, some of the water was evaporated till the weight of the mass was approximately 160 g.

The coated carbon granules were then poured into a solution of 200 cc. of 10% sodium hydroxide in water to which had been added 10 cc. of 37% formaldehyde. After standing 90 minutes the supernatant liquid was decanted, and the catalyst was washed in a Soxhlet extractor with water for 16 hours, when the wash water gave a negative test for chloride ion. The catalyst was then dried in a vacuum oven at 100° C.

The catalyst was loaded with the appropriate amount of phosphoric acid by soaking in a 20% phosphoric acid solution. A part of the excess water was removed under vacuum.

(B) Ethylene oxidation

The catalyst compositions were charged to an ethylene oxidation reactor comprising a vertically mounted 1" O.D. glass tube fitted with a thermowell, and gas inlet and outlet connections. Separate provision was made for feeding nitrogen directly into the reactor tube, and the reactor was externally heated.

Ethylene and oxygen were mixed, analyzed and metered upstream from the reactor. The combined ethylene-oxygen feed stream was fed into an externally heated bubbler containing water and the resulting water vapor-containing gaseous mixture fed into the reactor gas inlet. The reactor outlet was connected with a U trap cooled in a Dry Ice-alcohol bath for collecting condensables. Non-condensable gases were vented or sampled as desired.

After charging each catalyst material, the reactor tube was connected to the gas feed lines, a flow of dry nitrogen through the tube at 2 liters/hr. was initiated, and the catalyst bed was heated to about 100° C. The nitrogen feed was then terminated and the ethylene-oxygen-water vapor feed mixture was introduced into the reactor. The bed was then brought up to the desired reaction temperature and the experimental run was carried out.

Upon completion of each run the feed gas mixture was cut off and the reaction system purged with nitrogen until the catalyst temperature dropped to room temperature. The catalyst was then maintained under a blanket of nitrogen prior to initiating any succeeding run.

Examples comparing activity of palladium metal-phosphoric acid catalyst compositions with catalyst compositions incorporating other noble metals or palladium salts It has been found in accordance with the present invention that other catalyst materials, e.g. other noble metals such as platinum or rhodium, or palladium metal salts such as palladous chloride, in the presence of phosphoric acid, are not effective to catalyze the selective vapor phase oxidation of ethylene to acetic acid. Table I presents the results with palladium-phosphoric acid catalyst compositions in comparison with other catalysts.

In each experiment the reaction was carried out at atmospheric pressure, employing a feed (in millimoles per hour) of 70 ethylene, 12 oxygen and 37 water. The parameters utilized, and the reaction products obtained, in the several experiments were as follows:

TABLE I

| Catalyst composition | Catalyst composition weight (g.) | Reaction temp. (° C.) | Products in millimoles/hr. | | | | | Molar ratio of HOAc to HAc produced |
|---|---|---|---|---|---|---|---|---|
| | | | HAc | EtOH | HOAc | CO | CO$_2$ | |
| Experiment number: | | | | | | | | |
| 1........ 2% Pd + 82% H$_3$PO$_4$ | 10 | 150 | 0.1 | T | 1.0 | N.D. | 0.2 | 10 |
| 2........ 2% Pd + 82% H$_3$PO$_4$ | 10 | 175 | 0.1 | 0.2 | 1.6 | N.D. | 0.5 | 16 |
| 3........ 2% Pt + 82% H$_3$PO$_4$ | 5 | 175 | T | T | 0.03 | 0.1 | 1.0 | |
| 4........ 2% Pt + 82% H$_3$PO$_4$ | 10 | 200 | N.D. | N.D. | T | 0.4 | 2.7 | |
| 5........ 2% Rh + 82% H$_3$PO$_4$ | 5 | 175 | T | 0.03 | 0.03 | 0.2 | 2.5 | |
| 6........ 2% Ir + 82% H$_3$PO$_4$ | 10 | 200 | N.D. | N.D. | T | N.D. | 5.8 | |
| 7........ {2.7% PdCl$_2$, 10.7% CuCl$_2$, 5.5% FeCl$_3$, 82.0% H$_3$PO$_4$} | 10 | 150 | 0.6 | T | T | N.D. | N.D. | |
| 8........ {1.8% PdCl$_2$, 6.9% CuCl$_2$, 3.4% FeCl$_3$, 82.0% H$_3$PO$_4$} | 10 | 105 | 0.6 | N.D. | F.T. | N.D. | N.D. | |

Note.—HAc=acetaldehyde; EtOH=ethanol; HOAc=acetic acid; T=trace amount; F.T.=faint trace amount; N.D.=not detected.

The results with palladium-phosphoric acid are given in Experiments 1 and 2 at two different temperatures. Experiments 3 through 6 show that other noble metal salts give at most very small amounts of acetic acid, and substantially higher quantities of combustion products. Redox catalyst compositions containing phosphoric acid in two formulations represented by Experiments 7 and 8 do not yield acetic acid but instead acetaldehyde as the major product.

Illustrative of the utility of the present invention, Experiment 2 represents a 13% conversion to acetic acid, based on oxygen which was the limiting reactant present in the feed. The selectivity to acetic acid based on the ethylene consumed was 74%. The molar ratio of the acetic acid to acetaldehyde formed was 16. Since ethanol and acetaldehyde are also useful products, the selectivity to other than combustion products was 89%.

Examples of the use of different catalyst carriers and variation of the reaction parameters with which the palladium-phosphoric acid catalyst compositions are employed The following further experiments were performed in order to demonstrate the use of palladium metal-phosphoric acid catalyst compositions on various carriers under various conditions. All the catalyst materials were prepared with 2 weight percent palladium metal contents. The ethylene oxidation reactions employing the several catalysts identified in Table II below were conducted at atmospheric pressure using 10 grams of catalyst material with an hourly feed (in millimoles per hour) of 70 ethylene, 12 oxygen and 37 water.

Experiments 23–28 of Table III were performed in a pressure reactor at 65 p.s.i.a. using 5 grams of catalyst material. Ethylene and oxygen were fed via calibrated rotameters. Water was pumped in by a Lapp diaphragm pump. The feed materials were combined and passed through a pre-heater section prior to the reactor.

The reaction parameters employed and the principal products obtained in the several experiments are set forth in Tables II and III as follows:

place when the phosphoric acid was omitted in Experiment 26. Further examples of the use of silica and carbon catalyst carriers are illustrated by Experiments 27 and

TABLE II

| | Carrier | $H_3PO_4$ (percent) | Reaction temp. (° C.) | Products in millimoles/hr.[3] | | | | Molar ratio of HOAc to HAc produced |
|---|---|---|---|---|---|---|---|---|
| | | | | HOAc | HAc | CO | $CO_2$ | |
| Experiment number: | | | | | | | | |
| 9 | Alumina | 0 | 105 | T | N.D. | N.D. | 0.77 | |
| 10 | do | 0 | 135 | 0.3 | N.D. | N.D. | 5.3 | |
| 11 | do | 5 | 105 | 2.2 | 0.3 | N.D. | 0.6 | 7.3 |
| 12 | do | 5 | 135 | 2.5 | T | N.D. | 1.0 | |
| 13 | do | 10 | 105 | 3.5 | 0.3 | N.D. | 1.1 | 11.7 |
| 14 | do | 10 | 135 | 2.3 | F.T. | 0.6 | 1.5 | |
| 15 | do | [1] 0(5) | 105 | T | N.D. | N.D. | N.D. | |
| 16 | do | [1] 0(5) | 135 | T | N.D. | N.D. | N.D. | |
| 17 | Glass frits | 10 | 150 | 0.35 | F.Y. | N.D. | 0.1 | |
| 18 | do | 10 | 175 | 0.54 | T | N.D. | 0.2 | |
| 19 | Titania | 10 | 175 | 1.3 | F.T. | 0.6 | 0.4 | |
| 20 | Zirconia | 10 | 150 | 0.8 | F.T. | N.D. | 0.1 | |
| 21 | Alumina [2] | 10 | 135 | 2.3 | T | N.D. | 0.8 | |
| 22 | Silica | 25 | 150 | 9.4 | T | 0.6 | 1.5 | |

[1] No phosphoric acid; 5% phosphate added as $Na_3PO_4$.
[2] In addition to 2% palladium the catalyst composition contained 0.3% gold.
[3] No more than a trace of ethanol was detected in any of the experiments.

NOTE.—HAc=acetaldehyde; HOAc=acetic acid; T=trace amount; F.T.=faint trace amount; N.D.=not detected.

TABLE III

| Exp. No. | Carrier | Metals, wt. percent | | Reactor | | | Reactants, mM./hr. | | | Products, mM./hr. | | | Molar ratio HOAc/HAc |
|---|---|---|---|---|---|---|---|---|---|---|---|---|---|
| | | Pd | Au | $H_3PO_4$, percent | Temp., °C. | P.s.i.a. | $C_2H_4$ | $O_2$ | $H_2O$ | HOAc | HAc | $CO_2$ | |
| 23 | Silica | 2 | | 45 | 175 | 65 | 230 | 27 | 72 | 5.9 | 0.5 | 1.6 | 12 |
| 24 | do | 2 | | 45 | 170 | 65 | 287 | 33 | | 0.4 | T | 0.5 | |
| 25 | Carbon | 1 | 0.5 | 15 | 150 | 65 | 222 | 48 | 170 | 24.0 | 0.6 | 7.0 | 40 |
| 26 | do | 1 | 0.5 | | 150 | 65 | 222 | 48 | 172 | 0 | 0 | 34.9 | |
| 27 | Silica | 1 | | 4 | 150 | 65 | 222 | 48 | 171 | 18.6 | 0.6 | 5.5 | 31 |
| 28 | Carbon | 1 | | 15 | 150 | 65 | 222 | 49 | 134 | 20.1 | 0.3 | 5.4 | 67 |

Experiments 9 and 10 demonstrate that use of a palladium metal catalyst on alumina without phosphoric acid results in severe combustion and in the production of only a very small amount of acetic acid. A minimal amount of phosphoric acid changes the course of the reaction: two levels of phosphoric acid at two temperatures are represented by Experiments 11 through 14. In Experiment 11 there was an 18% conversion of oxygen (the limiting reactant) to acetic acid. The selectivity to acetic acid on ethylene consumed was 79%; the acetic acid to acetaldehyde molar ratio was 7. In Experiment 13 there was a 29% conversion of oxygen, an 84% selectivity to acetic acid, and an acetic acid to acetaldehyde product ratio of 12.

The catalyst compositions used in Experiments 15 and 16 incorporated trisodium phosphate instead of phosphoric acid; the results in these experiments demonstrate that the salt is not effective when utilized in place of the acid.

Interaction of the carrier with the phosphoric acid is not necessary, as exemplified in Experiments 17 and 18 in which a fritted glass was employed to support the phosphoric acid-palladium catalyst composition. Experiments 19 and 20 exemplify the use of titania and zirconia as carriers for the catalyst materials. In Experiment 21 the catalyst material was impregnated with 0.3% gold in addition to the palladium. A special silica extrudate was used in Experiment 22 to give a 78% conversion of oxygen to acetic acid, in 90% selectivity based on the ethylene reacted.

In Experiment 23, conducted at elevated pressure, a 22% conversion of oxygen to acetic acid was obtained with a selectivity of 79%. The molar ratio of acetic acid to acetaldehyde produced was 12. Experiment 24 was performed without water in the feed and demonstrates that in its absence very little acetic acid is produced. Carbon was employed as a carrier in Experiment 25 and the system found to be very effective. Only combustion took place when the phosphoric acid was omitted in Experiment 26. Further examples of the use of silica and carbon catalyst carriers are illustrated by Experiments 27 and 28, with excellent selectivities in terms of acetic acid relative to acetaldehyde.

From the preceding it will be apparent that the present invention provides an improved vapor phase process for the selective formation of acetic acid by the oxidation of ethylene. Since various changes may be made in the preferred embodiments of the process described hereinabove without departing from the scope of the invention, it is intended that the preceding should be construed as illustrative and not in a limiting sense.

What is claimed is:

1. A process for the selective production of acetic acid which comprises reacting in the vapor phase ethylene and oxygen in the presence of added water and in the presence of a supported catalyst composition consisting essentially of phosphoric acid, a catalytically effective amount of palladium metal, and optionally a metal selected from the group consisting of Group VIII and Group I-B metals, the palladium metal being deposited on a catalyst support in an amount of from 0.01 to 5% by weight of the supported catalyst composition and the phosphoric acid being present in an amount of at least 2% by weight of the catalyst support plus phosphoric acid.

2. A process for the preparation of acetic acid which comprises oxidizing ethylene with oxygen in the vapor phase in the presence of added water and in the presence of a catalytically effective amount of a catalyst consisting essentially of palladium metal, and optionally a metal selected from the group consisting of Group VIII and Group I-B metals, said palladium metal being supported on a carrier impregnated with phosphoric acid, the palladium metal being present in an amount of from 0.01 to 5% by weight of the supported catalyst and the phosphoric acid being present in an amount of at least 2% by weight of the catalyst support plus phosphoric acid.

3. The process of claim 2 wherein the oxidation is carried out at elevated temperatures and a pressure of from atmospheric to 300 p.s.i.g.

4. The process of claim 2 wherein the added water is present in an amount of at least 0.2 mole of water vapor per mole of oxygen.

5. The process of claim 2 wherein the catalyst support is alumina, silica or carbon.

References Cited

UNITED STATES PATENTS 3,534,093  10/1970  Gerberich _____ 260—533 R

FOREIGN PATENTS 1,527,716  6/1968  France _____ 260—533 R
1,468,542  4/1970  West Germany _____ 260—533 R LORRAINE A. WEINBERGER, Primary Examiner R. D. KELLY, Assistant Examiner U.S. Cl. X.R.

252—430, 437; 260—604 AC